United States Patent [19]

Hug et al.

[11] 4,187,474
[45] Feb. 5, 1980

[54] METAL VAPOR LASER DISCHARGE TUBE

[75] Inventors: William F. Hug, Pasadena; Randolph W. Hamerdinger, Glendora; Phillip D. Dunn, West Covina; Robert C. McQuillan, Glendora, all of Calif.

[73] Assignee: Xerox Corporation, Stamford, Conn.

[21] Appl. No.: 823,553

[22] Filed: Aug. 11, 1977

[51] Int. Cl.$^2$ .............................................. H01S 3/02
[52] U.S. Cl. ........................ 331/94.5 D; 331/94.5 G; 331/94.5 T
[58] Field of Search ...................... 331/94.5 D, 94.5 G, 331/94.5 T

[56] References Cited

U.S. PATENT DOCUMENTS

| | | | |
|---|---|---|---|
| 3,663,892 | 5/1972 | Klein et al. | 331/94.5 G |
| 3,878,479 | 4/1975 | Heising et al. | 331/94.5 G |
| 4,063,803 | 12/1977 | Wright et al. | 331/94.5 D |
| 4,103,253 | 7/1978 | Tokudome et al. | 331/94.5 G |

Primary Examiner—William L. Sikes
Attorney, Agent, or Firm—Irving Keschner

[57] ABSTRACT

An internal mirror metal vapor laser, and in particular, a helium-cadmium laser discharge tube, which is economical, compact and has a relatively long operating and shelf life, typically of 10,000 hours. A positive column helium-cadmium laser tube of the consumable type and having optical resonator mirrors integral with the tube ends to hermetically seal the tube is provided which includes a relatively large volume cadmium reservoir capable of containing sufficient cadmium for life times exceeding ten thousand hours. A resistive heater is applied to the cadmium reservoir for controlling the cadmium vapor pressure. A heat sunk diffusion confinement section and a cataphoretic confinement section are provided adjacent one end mirror and a heat sunk diffusion confinement section is provided adjacent the other end mirror to protect the end mirrors from condensing cadmium vapor. The laser tube includes a high pressure, permeable implant member which contains helium under pressure and which is utilized to compensate for helium pressure loss in the laser discharge tube to substantially extend the life time of the discharge tube.

8 Claims, 4 Drawing Figures

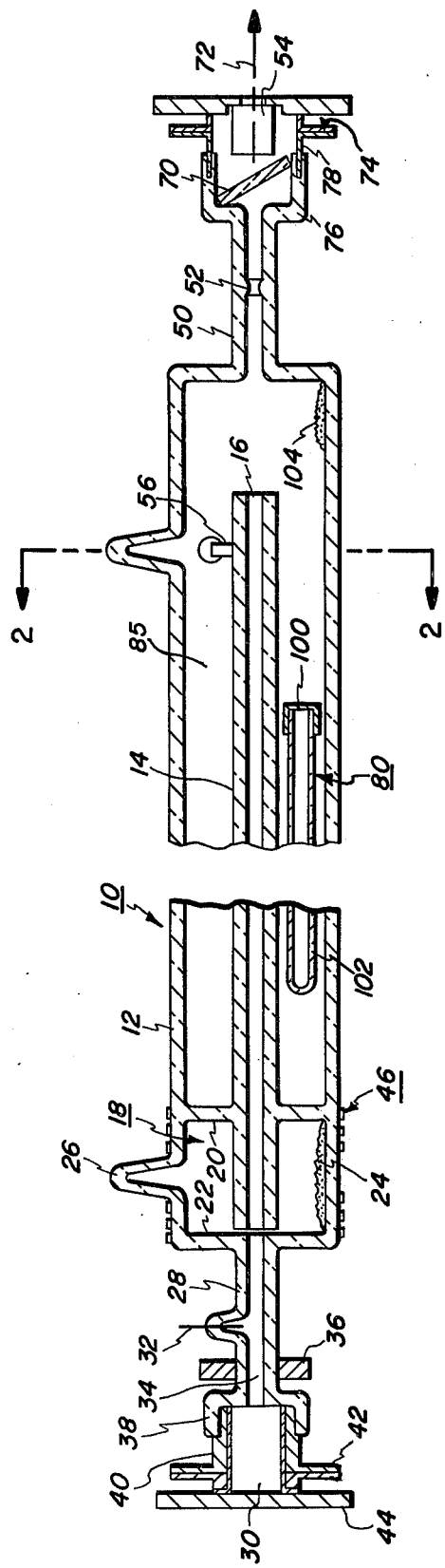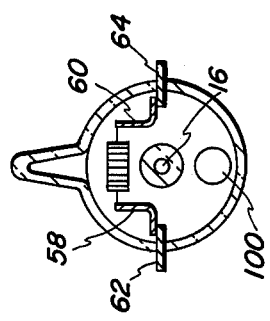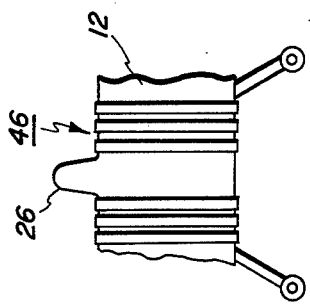

METAL VAPOR LASER DISCHARGE TUBE

BACKGROUND OF THE INVENTION

Metal vapor, or ion, laser discharge tubes, although commercially available, have been less than satisfactory when utilized in a machine application. This is particularly so in the cadmium ion laser that employs helium as an auxillary gas, the cadmium ion laser emitting light at either 4116 A in the blue region of the spectrum or at 3250 A in the ultraviolet region of the spectrum and capable of producing a continuous wave or pulsed output with modest discharge currents.

Degradation of the radiant output to an unacceptable level is the usual definition of laser tube failure. In turn, the output radiation varies with the helium and cadmium pressure and the type and concentration of impurities within the tube. The mechanisms for degradation failure in the helium-cadmium laser tubes are therefore related to depletion of the helium or cadmium supply or accumulation of impurities in the tube.

Depletion of the helium supply is, it is believed, usually a result of permeation through the tube seals and glassware, and trapping by the cadmium condensate. In a typical helium-cadmium laser tube with a consumable cadmium supply, such as shown in U.S. Pat. No. 3,878,479, permeation rates have been measured at 0.24 millitorr/hour. In the consumable laser tube designs, typical helium trapping rates by condensing cadmium are as high as 38 millitorr/hour. U.S. Pat. No. 3,663,892 discloses a technique for reducing condensate trapping rates. Depletion of the cadmium supply may be about $1.5 \times 10^{-2}$ mg/hr/mA for consumable washer tubes. In recirculating laser tube designs, such as shown in U.S. Pat. No. 3,683,295, the cadmium can be oxidized by dissociated water vapor, thereby depleting the available cadmium for evaporation.

The sources of impurities in laser tubes are both internal and external. Impurities such as hydrogen will increase the conduction and convection cooling losses from the discharge in the capillary bore and thereby cause alteration of the excited state population distribution in the discharge and the laser output.

Water vapor impurities generally dissociate in the tube with the oxygen causing oxidation of the cadmium supply and metal structural components. The residual hydrogen from this dissociation adds to the other sources of hydrogen to cause cooling of the discharge. Internal sources of impurities include absorbed and occluded water vapor and noncondensable gases in the glass walls and structure, evaporated or sputtered electrode or other structural materials, and other internal contaminants resulting from improper cleaning or handling of parts prior to assembly. Suppression or elimination of these problems necessitates that the tube be capable of bake-out at high temperatures (350° to 400° C.) under high vacuum since many of the contamination problems are internal to the tube. External sources of contamination are generally water vapor and hydrogen. The principal location for these contaminants entering the tube is through laser tubes using epoxy seals, the epoxy seal being very porous. Many or all of the mechanisms for degradation failure exist in present commercial laser tubes.

The above deficiencies in the prior art metal ion laser discharge tubes have cause a limited acceptance of these tubes in the laser industry. An important use of a helium-cadmium laser, for example, would be in a laser reading/writing system wherein the blue output of the laser can be effectively utilized as one component of a laser beam which scans (reads) an input document or as a writing beam to write (print) information on a medium sensitive to the blue laser light such as a photoconductor.

Therefore, what is desired in a helium-cadmium laser discharge tube, which, inter alia,: provides an increased lifetime by compensating for helium loss function; provides integral mirror structure to minimize inter cavity optical surface contaminants; provides a laser mirror seal structure which allows bake-out of the tube at the required high temperature to minimize internal tube contaminants; provides a mirror seal structure which is impermeable to leakage of external contaminants; provides diffusion and cataphoretic confinement of the cadmium vapor to protect the laser mirrors; provides a relatively large cadmium reservoir capable of containing sufficient cadmium for lifetimes exceeding 10,000 hours; and, allows for control of the cadmium vapor pressure to maintain a constant laser output indepedent of ambient environment.

It is therefore an object of this invention to provide a laser device of the above noted deficiencies.

It is an object of the present invention to provide a metal vapor laser which has substantially increased operating and shelf life times.

It is a further object of the present invention to provide an integral mirror helium-cadmium metal vapor laser discharge tube which has substantially increased operating and shelf life times than commercially available laser tubes.

It is still a further object of the present invention to provide an integral mirror helium-cadmium laser tube which includes a cadmium reservoir having a volume sufficient to contain enough cadmium for long operating and shelf life times.

It is an object of the present invention to provide a helium-cadmium laser tube wherein the cadmium vapor pressure is actively controllable such that it is substantially independent of ambient temperatures.

It is still a further object of the present invention to provide a helium-cadmium laser tube which incorporates a permeable implant member which contains helium under pressure and which is utilized to compensate for helium pressure loss in the tube whereby operating and shelf life times are substantially increased over commercially available laser tubes.

It is still a further object of the present invention to provide a helium-cadmium laser discharge tube which is compact, economical and has long operating and shelf life times.

It is a further object of the present invention to provide an integral mirror, helium-cadmium laser tube which incorporates both cataphoretic and diffusion confinement sections within the tube to prevent cadmium vapor from condensing on the laser mirrors.

SUMMARY OF THE PRESENT INVENTION

These and other objects are accomplished in accordance with the general concept of the present invention generally speaking, by providing an internal mirror, metal vapor, laser, and in particular, a helium-cadmium laser discharge tube, which is economical, compact and has a relatively long operating and shelf life, of e.g. 10,000 hours. A positive column helium-cadmium laser tube of the consumable type and having optical resonator mirrors integral with the tube ends to hermetically seal the tube is provided which includes a relatively large volume cadmium reservoir capable of containing sufficient cadmium for life times exceeding 10,000 hours. A resistive heater is provided in operable relation to the cadmium vapor for controlling the cadmium vapor pressure with an external optical feed back circuit for maintaining relatively constant the laser output. A heat sunk diffusion confinement section and a cataphoretic confinement section are provided adjacent one end mirror and a heat sunk diffusion confinement section is provided adjacent the other end mirror to protect end mirrors from condensing cadmium vapor. The laser tube includes a high pressure, permeable implant member which contains helium under pressure and which is utilized to compensate for helium pressure loss in the laser discharge tube to substantially extend the life time of the discharge tube.

More specifically, there is provided a helium-cadmium laser having at least one anode and cathode disposed within the gas envelope. Integral mirrors are disposed at opposite ends of the gas envelope which are substantially insensitive to misalignment and eliminate unnecessary inoperative sections of the laser tube which must be kept free of vapor and particulate contaminants and the like. A hard glass frit is provided which fixes the integral mirrors at opposite ends of the envelope to the gas envelope and allows the tube to be outgassed at desired elevated temperature ranges without damaging or destroying the hermetic integrity of the seal. A relatively large volume cadmium active reservoir is provided which provides a sufficient cadmium supply for substantially long operating life time and incorporates a resistive heater which controls the concentration of cadmium vapor in the cadmium reservoir and discharge capillary tube. In addition, a loss compensation implant device is provided in the gas envelope which includes an impermeable tube with a permeable membrane that is temperature dependent thus maintaining the helium concentration in the envelope. When a DC voltage is applied between the anode and the cathode the discharge is produced in the active gaseous medium which results in stimulated emission gain for continuous wave generation of laser light. Cadmium is supplied from the cadmium reservoir in close proximity to the anode and is allowed to flow after ionization by DC cataphoresis in the direction of the cathode during the continuous wave generation of the laser radiation. Thus there is provided a flow over a substantial length of discharge tube of substantially uniform ratio of a mixture of the gas materials. The cadmium vapor is removed in the condensing section from the path of laser radiation after it has flowed over the length of the tube having a substantially uniform ratio of the gaseous mixture.

BRIEF DESCRIPTION OF THE DRAWINGS

For a better understanding of the invention as well as other objects and further features thereof, reference is made to the following description which is to be read in conjunction with the following drawings wherein:

FIG. 1 is a partially schematic and partially cross-sectional view of the metal vapor laser discharge tube of the present invention;

FIG. 2 is a cross-sectional view of the tube shown in FIG. 1 in a direction indicated by the arrows;

FIG. 3 shows a portion of the laser discharge tube with a resistive heater wrapped thereon.

DESCRIPTION OF THE PREFERRED EMBODIMENT

Figure 4:
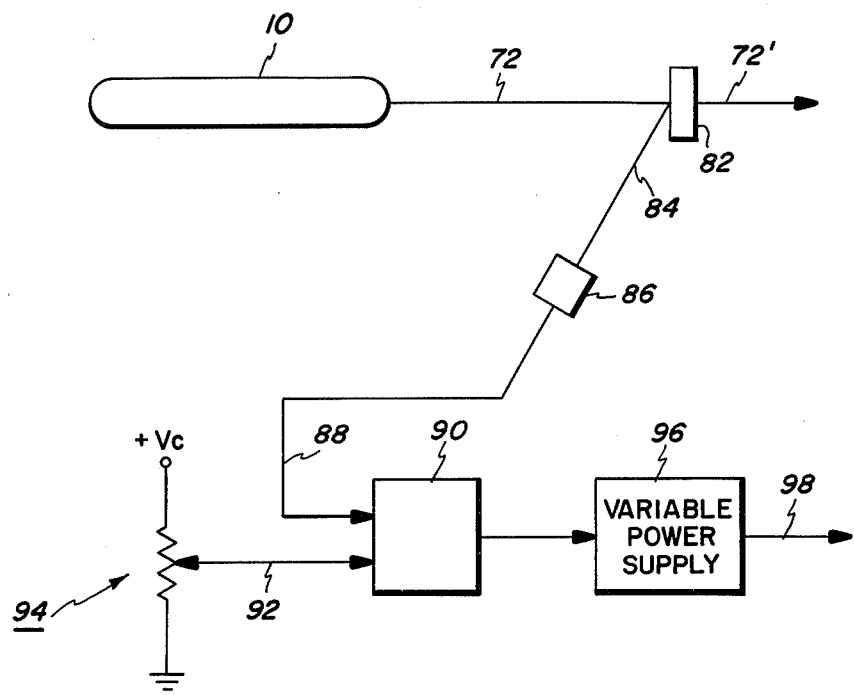
FIG. 4 is illustrative of a schematic diagram of the optical feedback circuit which may be utilized to control the metal vapor pressure.

Referring now to FIG. 1, the metal vapor laser tube 10 which comprises the present invention is shown. The tube comprises a glass envelope 12 with glass discharge capillary tube 14 having a bore 16 supported therewithin. A large volume metal containing reservoir 18 is formed by glass baffles 20 and 22 hermetically sealed to the envelope 12. The reservoir volume, typically 20 $cm^3$, is capable of containing a sufficient metal charge 24 to provide shelf and operating life times exceeding e.g. 10,000 hours. For a helium-cadmium laser, 10–15 grams of cadmium are inserted in reservoir 18 via tubulation 26 prior to tube operation. It should be noted that all glassware described with reference to the laser discharge tube 10, except for the laser mirror substrate, is preferably made of glass e.g. Corning 7052 glass. Adjacent to discharge capillary tube 14 and coaxial thereto is additional glass capillary tube 28 for providing cataphoretic confinement of the cadmium vapor in reservoir 18 and to provide primary protection of anode and mirror 30, described in more detail hereinafter. An anode pin electrode 32, preferably made of Kovar, a conventional iron cobalt nickel alloy is positioned adjacent the end of glass capillary tube 28 opposite reservoir 18 as shown. A heat sunk diffusion confinement capillary tube 34, preferably made of glass is formed on the other side of anode pin 32. A support member 36 supports the capillary tube portions 28 and 34 as shown. The flared end portion 38 of capillary tube 34 is sealed to a metal flange member 40 by standard glass to metal fusing techniques. An apertured flange member 42 is inert welded, Tig welded, to flange member 40 and the high temperature spherical resonator mirror 30, comprising a glass substrate and a plurality of dielectric reflecting layers is hard sealed to the laser tube body in a manner as described, for example, in copending application Ser. No. 552,396, filed Feb. 24, 1975, assigned to the assignee of the present invention.

Therein, the laser tube is described as an assembly comprising a laser mirror sealed to each end of the laser tube, the seal withstanding relatively high temperatures utilized to remove contaminants from the laser tube during fabrication thereof, the sealant also minimizing gas permeation therethrough during the laser tube utilization. This assembly is fabricated by first preparing an apertured recessed metal flange member. A slurry, comprising a glass frit and carrier, is introduced into the metal flange member and allowed to dry. The metal flange members placed in a first portion of a fixture and a glass substrate having a reflecting layer coated thereon is positioned adjacent the flange member recess with the reflecting member being at least coextensive to that with the aperture. The weighted second portion of the fixture contacts the non-reflecting side of the substrate to ensure that the glass substrate reflecting layer is in contact with the surface of the metal flange member via the dried slurry. The fixture is placed in an oven, the temperature thereof being increased to the fritting temperature of the glass frit for a predetermined time period, the oven thereafter being slowly cooled. The glass substrate is now hard-sealed to the metal flange member, forming the aforementioned assembly, the assembly being joined to a mating flange formed on the laser tube.

The reflecting layer is selected to withstand the fritting temperature with minimal optical and mechanical changes, and the glass substrate is selected to retain its mechanical dimension during and after thermal cycling to the fritting temperatures. The glass substrate, the sealant mixture and the metal flange member are selected to have closely matched coefficients of thermal expansion to minimize seal leakage during the laser tube operation. Thus, there is provided a hard glass frit seal which substantially eliminates gas permeation therethrough. The operation and fabrication of this glass frit seal is more specifically defined in pending U.S. Ser. No. 552,396, filed Feb. 24, 1975, assigned to the assignee of the present invention the relevant portions of which are hereby respectfully incorporated by reference.

A fixturing member 44 may be provided to align the generated laser beam during tube operation. As will be explained in more detail with reference to FIG. 3 hereinafter, a resistive heater 46 is wrapped around the tube envelope 12 adjacent reservoir section 18 for controlling the cadmium vapor pressure and is utilized in conjunction with an external optical feedback circuit described hereinafter with reference to FIG. 4 for maintaining a substantially constant laser output independent of ambient environment temperatures. On the cathode end section of laser tube 10 is provided a heat sunk diffusion confinement section 50 having an aperture 52 for the primary protection of cathode end mirror 54. The laser tube cathode 56, shown in a cross-sectional view in FIG. 2, comprises preferably, a resistive heated barium-strontium oxide cathode mounted to support members 58 and 60 which, in turn, are connected to external leads 62 and 64, respectively, for connection to a voltage source (not shown) for heating the cathode. An internal Brewster angle plate 70 may be provided at the cathode tube end for providing a polarized laser output beam 72. High temperature flat resonator mirror 54, comprising a glass substrate and a plurality of dielectric reflecting layers, is hard sealed to apertured metal flange member 74 utilizing the techniques described in the aforementioned copending application. As is set forth in the copending application, by forming a glass seal between the mirror substrate and the apertured metal flange member, the laser tube 10 can be subjected to the high bake-out temperatures required for removing tube contaminants without destroying the glass seal. The teachings of the copending application necessary for an understanding of the present invention are incorporated herein by reference. The flared portion 76 of capillary tube 50 is sealed to a metal flange member 78 by standard glass to metal sealing techniques and the laser end mirror assembly, comprising mirror 54 and flange member 74, is inert gas welded, Tig welded, to flange member 78. The joining of laser end mirror assemblies 30 and 54 hermetically seals the laser tube and provides the optical laser cavity required for lasing action. A high pressure permeable implant tube 80, is utilized to compensate for helium pressure loss in the laser discharge tube and to extend the discharge tube life time. In particular, laser implant tube 80 comprises a metal tube 102 with a permeable glass seal 100 having pressurized helium contained therein. The implant is arranged to allow a metered amount of helium to escape into the large volume helium reservoir 85 during operation of the laser discharge tube 10.

As set forth hereinabove, the mirror assembly comprises a metal flange 40 sealed to the tube envelope 12 and an apertured metal flange 42 joined thereto having a fully reflecting mirror sealed to metal flange 42. Mirror 30 typically comprises a glass substrate upon which is coated a substantially totally reflecting layer comprising a plurality of dielectric layers, the reflecting layer facing inward (within the tube envelope). The cathode and mirror assembly comprises a metal flange 78 sealed to the tube envelope 12 and an apertured metal flange 74 joined thereto. A partially transmissive mirror 54 is sealed to apertured flange 74 in a manner as described in the aforementioned copending patent application. Mirror 54 comprises a glass substrate upon which is coated a partially transmissive layer of dielectric material, the transmissive layer being positioned within tube envelope 12. Mirrors 30 and 54 are appropriately coated with layers of dielectric material such that only a laser beam 72 of a desired wavelength (i.e. approximately 4416A) is transmitted by mirror 54, beam 72 being utilized by external apparatus such as for the scanning purposes as set forth hereinabove. Typical dielectric materials include $SiO_2$, $TiO_2$ among others.

As set forth hereinabove the cadmium reservoir is selected to provide a controllable laser output beam 72, over a broad range of ambient temperatures e.g. 60° F. to 120° F. The cathode is a low cost directly heated barium strontium oxide cathode typical of those utilized in flourescent lamps. This cathode is thermally and chemically compatible with the laser tube and capable of providing the required discharge currents, typically in the range from about 20 ma to about 150 ma. The cathode end mirror 54 is protected by utilizing the diffusion confinement section 50 near the cathode end of the laser tube whereas anode end mirror 30 is protected by utilizing both cataphoretic and diffusion confinement sections 38 and 34, respectively, adjacent the anode end of the laser tube 10. It is to be noted that resonator cavity configurations with thermal stability factors (defined below) less than about 0.2 do not require external support (other than the laser tube seal shown) of the laser mirrors. Thermal stability for the above described purpose is defined as follows:

$$\text{Thermal Stability Factor} = \frac{\text{Angular Misalignment of Mirrors due to non steady thermal environment}}{\text{Misalignment tolerance of optical cavity}}$$

Configurations with thermal stability factors greater than about 0.2 may require external support of the laser mirrors in order to provide stable laser output. As is well known in the art, the internal Brewster angle plate 70 is made of transparent material and formed at the Brewster angle to provide a plane polarized laser output beam 72.

In the preferred embodiment, a few grams, typically 10–15 grams, of cadmium metal is inserted into reservoir 18 via tubulation 26. A heater 46 may be provided to vaporize the cadmium to a preselected pressure and control the vapor pressure of the cadmium as described hereinbelow. It should be noted that the heat of the discharge generated between the anode and cathode may also cause vaporization of the cadmium.

Helium gas is introduced into envelope 12 at a preselected pressure (approximately 6.0 Torr) employing vacuum processing equipment and helium fill tubulation 80.

A solid cadmium charge 24 is deposited in reservoir 18 and tubulation 26 is sealed off prior to laser tube operation. Heater 46 is energized and the cadmium metal is vaporized, the preferred vapor pressure being attained by controlling the cadmium temperature as will be set forth hereinbelow with respect to FIG. 4. Preferably the cadmium temperature is maintained at approximately 290° C.

The operation of tube 10 is initiated by first heating the cathode filament by applying e.g. 4 volts at 2 amperes being typical and thereafter providing a high voltage pulse (typically 20 kilovolts) of sufficient duration (2 to 5 microseconds) between the anode 32 and cathode 56 electrodes to cause the intervening gas to ionize. An external discharge power supply circuit maintains electrical current in the discharge capillary tube 14 constant at a value determined by the tube design and selected to provide the desired output wavelength. The cadmium reservoir control heater 46 is energized by applying approximately 60 watts thereto to heat and evaporate the stored cadmium until the tube begins to lase.

The discharge initiated between anode electrode 32 and cathode 56 via the voltage supply excites the helium atoms to an energy state from which energy is imparted to the vaporized cadmium atoms. This causes the cadmium to be ionized and to be excited to the required energy levels required for lasing action. The ionized cadmium atoms are then transported along the length of the discharge confining bore tube 14 to cathode 56 via the process of cataphoresis in a manner well known in the art. When the excited ionized cadmium atoms return to a lower energy state, laser radiation at 4461A (blue) is produced. Since the discharge power is inversely related to the cadmium vapor pressure, the system is self regulating once a proper cadmium temperature is established with a current regulated heater power supply. The vapor cadmium condenses in regions 104 due to the cooler tube operation thereat.

The cadmium vapor is distributed in capillary tube 14 near cathode 56 by cataphoretic pumping. In order to prevent the cadmium vapor from condensing on mirror 54 due to the diffusion properties of cadmium atoms, capillary tube 50 is provided with a sufficient length (typically 1 inch) such that any cadmium vapor will condense before reaching mirror 54. On the anode end of the laser tube assembly, a cataphoretic confinement section 28 inhibits cadmium ions from depositing on mirror 30 while diffusion section 34 is selected to cause any cadmium atoms diffusing towards mirror 30 to be condensed prior to reaching the mirror. An external optical output feedback control circuit, described hereinbelow, senses the laser output and controls the amount of power dissipated in heater 46 to provide substantially constant laser output since laser output is dependent, inter alia, on the cadmium vapor pressure.

FIG. 4 illustrates in a simplified representation, how heater 46 is controlled to control the cadmium vapor pressure such that a constant output laser beam 72 is provided. In particular, a beam splitter 82 is interposed in the path of laser beam 72, a substantial portion of the beam 72' being transmitted therethrough to be utilized by the external apparatus. A portion 84 of beam 72 is reflected by beam splitter 82 and is incident on photodetector 86. Photodetector 86 generates a current on lead 88 the magnitude of which is directly proportional to the intensity of the incident beam 84. The current on lead 88 is coupled to one input of a differential amplifier 90, the other input of which is coupled to adjustable tap 92 of potentiometer 94. The output of differential amplifier 90 is connected to a variable power supply 96, the output of which is coupled to resistive heater 46, shown in FIG. 1, via lead 98.

In operation, adjustable tap 92 of potentiometer 94 is initially positioned such that variable power supply 96 provides a current on lead 98 sufficient to cause heater 46 to vaporize the cadmium in reservoir 18 to a predetermined temperature (i.e. 280° C.) to provide a desired output laser beam 72'. A portion of the actual laser beam output 72 is generated by photodetector 86 which generates a corresponding signal on lead 88. This signal, which is preferably converted to a voltage signal, is coupled to differential amplifier 90 and compared with the reference signal provided by adjustable tap 92. If the signals are different, an arrow signal is produced by differential amplifier 90 and coupled to variable power supply 96 which generates an appropriate signal on lead 98 to increase (or decrease) the power supplied to resistive heater 46 such that the error signal is reduced to zero. In this manner, a cadmium vapor pressure, dependent upon the setting of tap 92 and maintained at a substantially constant value during laser tube operation, provides a beam of constant laser output power.

To further define the specifics of the present invention, the following examples are intended to illustrate and not limit the particulars of the present system. Parts and percentages are by weight unless otherwise indicated.

I. A glass envelope having a length of 58 cm and a diameter of 3.5 cm fabricated by borosilicate glass is provided with integral mirrors having a diameter of 15 mm at opposite ends sealed to the tube envelope with a hard glass frit seal more specifically defined in U.S. Ser. No. 552,396, assigned to the assignee of the present invention. An anode comprised of Kovar, an iron-nickel-cobalt alloy is provided at one end of the tube, a cathode comprised of a direct heated BaSr O filament is provided at the other. A cadmium reservoir containing at least 10 gms and having a capacity of about 5 cm$^3$ is provided in close proximity to the anode along with cataphoretic confinement and diffusion confinement sections. A diffusion confinement section is located in close proximity to the cathode. Both the diffusion and the cataphoretic confinement section are employed to protect vapor from reaching the mirrors at opposite ends of the tube. The discharge tube is coaxially mounted in the gas envelope which communicates between the anode and the cathode having an inside diameter of 1.9 mm and a tube wall thickness of 3 mm being fabricated of borosilicate glass. Helium is filled into the gas envelope using conventional techniques and a passive helium loss compensation implant is provided which controls the pressure of the helium to about 6 Torr. The helium implant comprises an impermeable tube fabricated of Kovar having a permeable glass membrane for which the permeation rate is temperature dependent. An auxilliary helium supply is operatively associated with the gas envelope to provide a reservoir supply of helium during the operation of the tube. A discharge is struck between the anode and the cathode employing conventional discharge ignition techniques and the discharge is maintained at 90 milliamperes. A resistive heater wrapped around the cadmium reservoir is energized to provide cadmium vapor at a pressure about $10^{-2}$ Torr in the space of the reservoir which diffuses into the discharge tube. The helium and cadmium atoms collide providing ionization and excitation of the cadmium and thereby providing for stimulated emission of the appropriate wavelength. Cadmium ion density is maintained with reasonable uniformity in the discharge tube as the cadmium ions flow from the cadmium reservoir towards the cathode by cataphoresis. Thus, a continuous wave is generated and blue light emitted at 4116A measured by spectroscopic means.

II. The procedure as outlined in Example 1 is again performed with the exception that helium pressure is 5 Torr and the cadmium is $10^{-1}$ Torr.

III. The procedure as outlined in Example 2 is again performed with the exception that the cadmium pressure is $10^{-2}$ Torr.

IV. The procedure as outlined in Example 2 is again performed with the exception that the cadmium pressure is $10^{-3}$ Torr.

V. The procedure as outlined in Example 1 is again performed with the exception that the helium pressure is 7 Torr and the cadmium pressure is $10^{-1}$ Torr.

VI. The procedure as defined in Example 1 is again performed with the exception that the helium pressure is 7 Torr.

VII. The procedure as defined in Example 1 is again performed with the exception that the helium pressure is 7 Torr and the cadmium pressure is $10^{-3}$ Torr.

VIII-XV. The procedure as outlined in Example 1 is again performed with the exception that the discharge current is employed at 50, 60, 70, 80, 90, 100, 110, and 120 milliamperes.

While the invention has been described with reference to its preferred embodiment it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

Anyone skilled in the art will have other modifications occur to him based on the teachings of the present invention. These modifications are intended to be encompassed within the scope of this invention.

What is claimed is:

1. A gas laser comprising an envelope having opposite open ends; an active gaseous medium disposed within said envelope, said medium comprising a mixture of gases or materials including at least one component having a lower ionization potential than the ionization potential of at least one other component in said mixture; at least one anode and at least one cathode disposed within said envelope; means for applying a DC voltage between said anode and said cathode to provide a discharge in said active gaseous medium which results in stimulated emission gain for continuous wave generation of laser radiation; means adjacent to said anode for supplying the low ionization potential component of said gaseous mixture which flows after ionization by DC cataphoresis in the direction of said cathode during the continuous wave generation of said laser radiation; means for continuously removing said low ionization potential component from said gaseous mixture and from the path of said laser radiation after it has flowed over said mixture length; means disposed at the opposite ends of said gas envelope for sealing said envelope open ends; an active reservoir control which controls said low ionization potential component; and loss compensation means for said other component in said mixture, said loss compensation means comprising a member containing additional amounts of said other component, a predetermined amount of said additional other component entering into said envelope from said member during operation of said gas laser.

2. The laser as defined in claim 1 wherein said low potential ionization component comprises cadmium.

3. The laser as defined in claim 1 wherein said other component in said mixture comprises helium.

4. The laser as defined in claim 3 wherein said helium loss compensation means is provided by a helium implant structure disposed within said laser tube within said gas envelope, said structure comprising an impermeable tube with a permeable membrane.

5. The laser as defined in claim 4 wherein the membrane comprises glass.

6. The laser as defined in claim 3 wherein said additional amounts of helium is maintained under pressure within said member.

7. The laser as defined in claim 6 wherein said predetermined amount of said additional component is temperature dependent.

8. The laser as defined in claim 1 wherein said sealing means comprises metal flange members having mirrors associated therewith and said envelope open ends having metal flange members sealed thereto, the metal flange members of said sealing means being integral with the metal flange members sealed to said envelope open ends.

* * * * *